United States Patent [19]

Buchner et al.

[11] Patent Number: 4,974,176

[45] Date of Patent: Nov. 27, 1990

[54] MICROTEXTURE FOR CLOSE-IN DETAIL

[75] Inventors: Gregory C. Buchner, South Daytona; Richard G. Fadden, Jr., Ormond Beach, both of Fla.

[73] Assignee: General Electric Company, Syracuse, N.Y.

[21] Appl. No.: 135,003

[22] Filed: Dec. 18, 1987

[51] Int. Cl.$^5$ .................. G06F 15/72; G06F 3/153
[52] U.S. Cl. .................................... 364/522; 340/729
[58] Field of Search .................. 364/518, 521, 522; 340/747, 728, 729

[56]  References Cited

U.S. PATENT DOCUMENTS

| | | | |
|---|---|---|---|
| 4,371,872 | 2/1983 | Rossman | 340/728 |
| 4,586,038 | 4/1986 | Sims et al. | 340/729 |
| 4,615,013 | 9/1986 | Yan et al. | 364/521 |
| 4,692,880 | 9/1987 | Merz et al. | 364/521 |
| 4,727,365 | 2/1988 | Bunker et al. | 340/728 |
| 4,788,572 | 5/1988 | Latham | 364/518 |

Primary Examiner—David L. Clark
Attorney, Agent, or Firm—Paul Checkovich; Richard V. Lang

[57] ABSTRACT

In a computer image generation system, as a viewpoint approaches a surface of an object and is closer than a predetermined threshold distance from the surface, a texture pattern obtained from cell data becomes fuzzy, and may not provide adequate motion cues for training, such as piloting an airplane. In accordance with the present invention, apparatus and method provide random data at a predetermined derived level of detail for combining with cell data to define the surface including texture of the object when the object is closer to the viewpoint than the threshold distance. The apparatus may be readily retrofitted into an existing system.

14 Claims, 1 Drawing Sheet

MICROTEXTURE FOR CLOSE-IN DETAIL

BACKGROUND OF THE INVENTION

This invention relates to cell texture, and, more particularly, to microtexture for providing adequate detail when the distance between an observer and a feature in an image to be displayed is less than a predetermined threshold.

In computer image generation systems, cell texture may be used to provide visual detail for surfaces (often represented by faces or polygons) of objects or features to be displayed. However, as the distance between an observer or viewpoint and the object or feature decreases, the size of the image of a cell increases, so that when the image of a single cell is rendered by more than one pixel of a display means, the texture pattern loses some definition and tends to become fuzzy. (A cell is the smallest unit of characteristic definition that is accessible by the system and a pixel is a picture element of the display means). Reduction of texture definition may result in a loss of motion cues from the display that are necessary for adequate and realistic training exercises, such as airplane pilot training.

In one type of computer image generation system, the distance from an observer into a scene to be displayed is divided into a plurality of predetermined range intervals. Each range interval corresponds to a respective level of detail (LOD). The LOD's are arranged so that the LOD closest the observer, or maximum LOD for the system, (hereinafter designated "LOD(0)") contains the most detail and therefore the largest number and smallest sized cell for a predetermined area, with each succeeding LOD (i.e. receding from the view-point) containing a respective decreasing amount of detail with correspondingly smaller number and larger sized cell for the same area. For example, since typically a binary system of data storage and manipulation is used, it is convenient to have adjacent LOD's vary by a factor of four (i.e. a factor of two in each of logically orthogonal X and Y addresses of data storage areas) in amount of detail and cell size.

No matter where the boundary closest to the viewpoint of the maximum LOD is established, there may be occasion to display portions of the scene which are closer to the viewpoint than the nearest boundary of LOD(0). Although additional specific detail could be stored for LOD's closer to the viewpoint than LOD(0) (such LOD's are referred to hereinafter as having a negative argument, e.g. LOD(−1), LOD(−2), etc.), it would generally be infeasible, both economically and practically, to do so, since the additional memory required for an extra LOD would be four times the memory requirement of the next less detailed LOD. For example, six additional LOD's having more specific detail than LOD(0) would require over 8,000 times more memory than a system having a most detailed LOD of LOD(0). The term "specific detail" refers to detail which defines a predetermined feature of an object, such as contour, whereas the term "non-specific detail" refers to a feature of an object, such as texture, that may be hinted or suggested. Of course, there may be occasions when it is desirable to represent a feature, such as texture, by both specific and non-specific detail, dependent on the distance from a viewpoint to the object.

Accordingly, it is an object of the present invention to provide apparatus and method for supplying texture detail to close-in surfaces without unduly increasing memory size requirements.

Another object is to provide apparatus for supplying texture detail to close-in surfaces wherein the apparatus may be readily retrofitted into an existing image generation system.

SUMMARY OF THE INVENTION

In accordance with the present invention, in a computer image generation system, wherein an object of a scene to be displayed is disposed between a viewpoint and the proximate boundary of a predetermined maximum level of specific detail of the system, a method for defining detail including texture of a surface of the object comprises obtaining data representative of the object at the maximum level of detail, obtaining random data at a predetermined derived level of detail in response to the distance from the viewpoint to the object and combining the first data and the random data to form image data, wherein the image data define detail including texture of the surface of the object. The random data is independent of the data at the maximum level of detail and may include fractal data. The random data from a source random data may be predeterminedly attenuated for providing random data at the derived level of detail. A display of the scene with the object exhibits texture in response to the image data.

An image of an object is generated from stored data by intensity (i.e. shades of gray) or color intensity control of a plurality of pixels (picture elements) of a display device forming the image of the object. The intensity or color intensity for each pixel is derived from a plurality of cells and/or the random data, each cell having a predetermined intensity or color intensity value.

The random data may be obtained from one of a plurality of mini-cells, wherein each mini-cell is the same size as a cell at the maximum level of detail and is further sub-divided to include a plurality of information centers. Data from predetermined ones of the information centers are selected in response to the center of the image of a pixel to be displayed for constituting the mini-cell data. The one of the plurality of mini-cells is randomly selected. Data for each of the information centers of the plurality of mini-cells are predeterminedly assigned so that to an observer no recognizable pattern over a predetermined area of the object is discernible when the object is displayed.

Further, apparatus for supplementing the texture pattern of a surface of an object to be displayed when the object is between a viewpoint and the proximate boundary of a maximum level of detail comprises switching means for receiving first cell data at a first level of detail and random data at a derived level of detail and blending means coupled to the output of the switching means. The switching means supplies the first cell data when the object is beyond the proximate boundary of the maximum level of detail and supplies the random data when the object is between the viewpoint and the proximate boundary of the maximum level of detail.

The blending means receives second cell data at a second level of detail, the second level of detail being less than the first level of detail. The blending means is for blending the first and second cell data when the object is beyond the proximate boundary of the maximum level of detail, and for blending the second cell data and the random data when the object is between the viewpoint and the proximate boundary of the maximum level of detail. The resulting blended data includes intensity information for controlling a pixel to be displayed.

Additionally, smoothing means may be included for smoothing data from respective ones of a respective plurality of first and second cells having first and second cell data and for smoothing random data from predetermined ones of a plurality of information centers of one of a plurality of mini-cells having random data available therefrom. Random select means randomly selects the one of the plurality of mini-cells in response to the location of the object.

The features of the invention believed to be novel are set forth with particularity in the appended claims. The invention itself, however, both as to organization and method of operation, together with further object and advantages thereof, may best be understood by reference to the detailed description taken in connection with the accompanying drawing.

DETAILED DESCRIPTION

Figure 1:
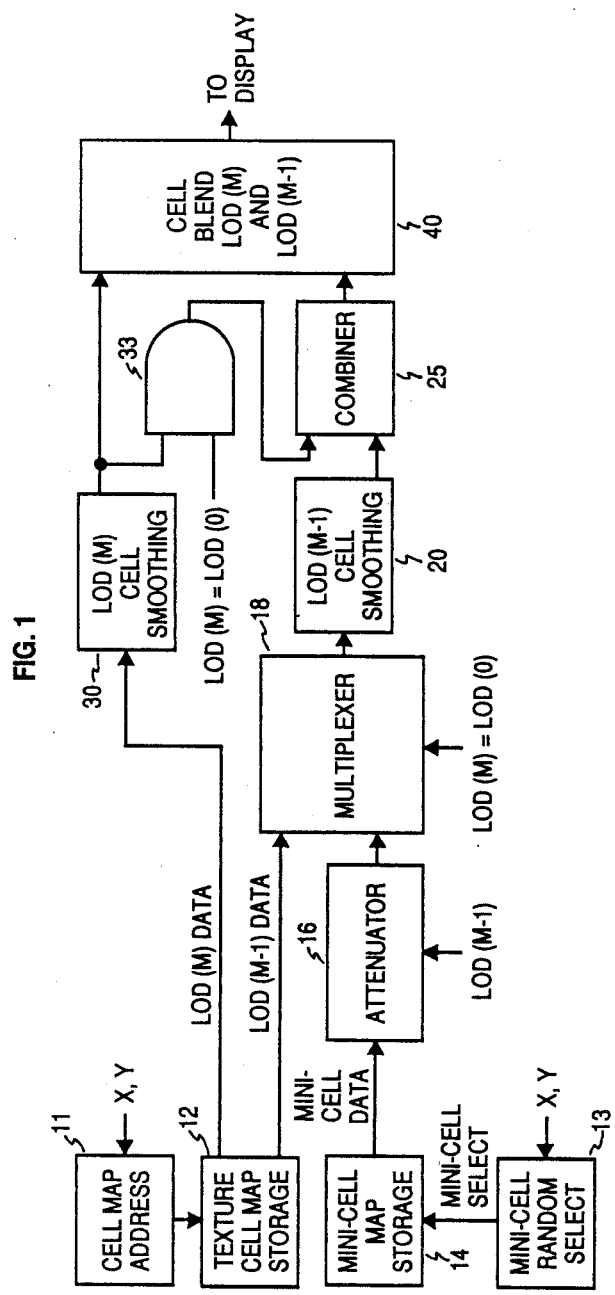
FIG. 1 is a block diagram of a texture generator for providing detail to close-in surfaces in accordance with the present invention.

Referring to FIG. 1, a block diagram of microtexture circuitry for presenting close-in detail in accordance with the present invention is shown. Attention is directed to copending application Ser. No. 865,591, filed May 21, 1986, entitled, "Advanced Video Object Generator"—Bunker et al, now U.S. Pat. No. 4,865,591, which is incorporated herein in its entirety by reference thereto, for an explanation of cell texturing in general, and for cell smoothing and cell blending in particular.

The microtexture circuitry of the present invention includes apparatus for simultaneously processing data for the same area of a scene to be displayed at two different LOD's. LOD(M) data, defining texture and/or features for an area of a scene to be displayed is supplied from a texture cell map storage means 12, such as a random access memory (RAM), to the input of an LOD(M) cell smoothing circuit 30, and LOD(M-1) data, defining texture and/or features at a greater resolution than data for LOD(M) of the area of the scene to be displayed is supplied from cell map storage 12 to the input of an LOD(M-1) cell smoothing circuit 20 through a multiplexer 18. Multiplexer 18, which functions analogously to a double pole, single throw switch, is controlled by the LOD(M)=LOD(0) signal so that when LOD(M) is not equal to LOD(0), the LOD(M-1) data signal is supplied to LOD(M-1) cell smoothing circuit 20. When LOD(M) is equal to LOD(0), mini-cell data from a mini-cell map storage means 14, such as a RAM, is supplied through an attenuation control circuit 16 and multiplexer 18 to the input of cell smoothing circuit 20.

The output of LOD(M) cell smoothing circuitry 30 is coupled to an input of cell blend circuitry 40 for LOD(M) and LOD(M-1). The output of LOD(M-1) cell smoothing circuitry 20 is coupled to another input of cell blend circuitry 40 through a combiner circuit 25. The output of LOD(M) smoothing circuit 30 is also connected to an input of combiner circuit 25 through switch means 33, such as an AND gate. The signal from the output of smoothing circuit 30 is coupled to the input of combiner 25 whenever LOD(M) is equal to LOD(0). Although connections between circuit components are represented by a single line, it is to be understood that parallel data transfers may be provided where desired, such as for increasing overall system throughput.

In a computer image generation system, an object or feature is typically represented by one or more polygons, or faces. For providing texture in accordance with the present invention, each face is sub-divided into a plurality of cells, wherein each cell is assigned a predetermined intensity or color intensity value for defining texture of the object or feature.

Texture cell map storage means 12 include a plurality of cell maps with each cell map representative of a different level of detail or resolution. Thus, for a system having cell maps for LOD(0) through LOD(9), ten cell maps ranging in detail from a $512 \times 512$ cell array to a $1 \times 1$ cell array, respectively, and descriptive of the same area of a scene to be displayed may be stored. Cell map address means 11, which is described in detail in the Bunker et al application, receives X, Y coordinate data representative of the location of a pixel of a display device to be displayed and selects the appropriate portion of a cell map to be supplied to smoothing circuitry 20 and 30 from cell map storage means 12.

LOD(M) signifies the level of detail indicated by argument M, wherein LOD(0), or maximum LOD, designates the level of detail having the greatest amount of detail for a given area, and therefore the smallest cell size and finest resolution of specific detail available for the system. The proximate or nearest boundary for LOD(0) is established at a predetermined distance from a viewpoint into the scene and the remaining coarser levels of detail, i.e. LOD (1), LOD (2), etc., having positive integer arguments are assigned to contiguous progressively deeper range intervals into the scene.

For the portion of the scene wherein the range from the viewpoint to an object in the scene is less than the range from the viewpoint to the nearest, or proximate LOD(0) boundary, the convention for defining LOD(M) would require a negative argument for LOD(M-1). Since the meaning of a negative argument for LOD(M-1) is not defined, objects appearing in the area of the scene at a range closer than the boundary of LOD(0) would only be represented by data from LOD(0) and the cell smoothing circuitry and related channel hardware for processing data for one LOD would not be used during processing of data for objects appearing in the area requiring a negative argument for LOD(M-1).

The present invention may be used to take advantage of hardware that exists in a system such as described by Bunker et al by retrofitting the system for generating more detail in the area requiring a negative argument for LOD(M-1). Of course, the system described in accordance with the present invention may be fabricated using the principles taught herein to be self-sufficient so that it may be used with other image generating systems as well.

It is noted that regardless of where the proximate boundary for the level of detail having the finest resolution for the system is established, there may be occasion to display an object that is disposed closer to a viewpoint than the proximate boundary. To accommodate this object orientation, while maintaining texture definition for the object, the present invention uses derived levels of detail.

In a currently preferred embodiment of the present invention, six negative, or derived, LOD's are defined for the system. Although it may be possible predeterminedly to establish data having a corresponding finer resolution for each of these negative LOD's and store it in a corresponding texture cell map, in most, if not all cases, it would be economically infeasible to do so. As noted above, each LOD generally requires four times the storage capacity than the next less detailed LOD. The additional memory requirements for six more detailed LOD's would be the sum of the additional storage required for each LOD or approximately 8,000 times the total storage required to store LOD(0). If, for example, the LOD(0) data is stored in a $512 \times 512$ or $1024 \times 1024$ array, the additional memory requirements i.e. for a respective $32,768 \times 32,768$ or $65,536 \times 65,536$ array for LOD($-6$), and associated address control logic would be quite impractical for a real-time image generation system.

When the object to be described is closer to the viewpoint than the near boundary of LOD(0), the argument for LOD(M) will be zero. Accordingly, multiplexer 18 will direct mini-cell data from mini-cell map storage means 14 to cell smoothing circuitry 20 while decoupling LOD(M-1) data from cell map storage means 12 to smoothing circuitry 20.

Figure 2:
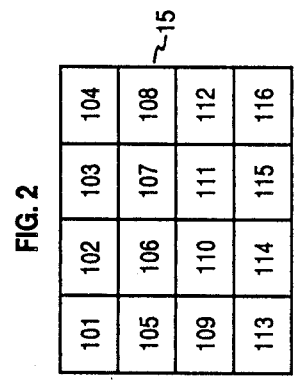
FIG. 2 is a diagram of a mini-cell map useful with the texture generator of FIG. 1.

Referring to FIG. 2, a mini-cell map in accordance with the present invention is shown. In a currently preferred embodiment of the present invention, mini-cell map 15 includes 16 uniquely different mini-cells 101–116. Each mini-cell 101–116 of mini-cell map 15 is predeterminedly sized so that it exactly subtends the entire area occupied by a single cell of the LOD(0) texture cell map—the one offering the finest resolution and therefore, the one having the smallest sized cell available to the system.

Each mini-cell, say mini-cell 101 for example, includes a $64 \times 64$ array of data information centers. That is, for a square mini-cell, a single information center may be an $m \times m$ square. The data stored at and available from each data information center is predeterminedly assigned according to the following rules: regardless of how or which of the mini-cells are assigned over a surface, contiguous edges between neighboring mini-cells will not be observable; no pattern recognizable to an observer over an area of the image will be established; and the resulting texture will appear natural with an appropriate variation of brightness. These characteristics can readily be obtained or sufficiently approximated for the benefit of a viewer by appropriate predetermined randomization of the data available from each information center of a mini-cell. For instance, a respective four bit code may be used to represent the data available from each information center. Also, fractal information from naturally occurring phenomena may be used. The data obtained from an information center is independent from, and not related to, the cell data with which it is ultimately combined. Thus, the data available from an information center at a derived LOD provides non-specific detail description as opposed to the specific detail description available from a defined LOD, e.g. LOD(0). The texture pattern obtained from a combination of information center data with cell data resembles a random fractal pattern that does not exhibit aliasing.

Referring again to FIG. 1, for obtaining the desired number of negative LOD's from a single mini-cell map, attenuation control means 16 is disposed to receive mini-cell data from mini-cell map storage means 14. Mini-cell random select means 13 has an output connected to an input of storage means 14 for supplying a mini-cell select signal thereto. One of the mini-cells available from storage means 14 is selected in response to the select signal. The select signal from select means 13 is randomly generated. However, the random selection is reproducible. That is, for a predetermined area of the scene to be displayed, it is desirable to have the same mini-cell selected each time the area is visible. To ensure reproducibility, the same X, Y coordinate pair that is supplied to cell map address means 11 is also provided to mini-cell random select means 13 so that the random selection of a mini-cell from storage means 14 is performed in response to the X, Y coordinate pair.

The amount by which the mini-cell data signal is attenuated by attenuator means 16 before being supplied to multiplexer 18 is controlled by the value of the LOD(M-1) signal provided to attenuator means 16. Maximum attenuation is supplied when the object is at LOD(0) with monotonically decreasing attenuation applied at each negative LOD as the distance between the object and the viewpoint decreases until zero attenuation is obtained at LOD($-6$). Attenuator means 16 may include a programmable read only memory (PROM) for providing the appropriate attenuation in response to the value of the (M-1) argument of the LOD(M-1) signal supplied thereto. The range intervals for each derived LOD are predeterminedly defined, analogously to the existing LOD's in the system.

When the LOD(M)=LOD(0) signal supplied to multiplexer 18 is true, i.e. when argument M is equal to 0, the input signal to multiplexer 18, which constitutes the attenuated mini-cell data from attenuator control means 16, is coupled to the output of multiplexer 18, while the LOD(M-1) Data signal from texture cell map storage means 12 is decoupled from the output of multiplexer 18. LOD(M-1) cell smoothing circuitry 20 thus receives the attenuated mini-cell data output signal from mini-cell map 14. The attenuated output from mini-cell map 14 includes information from contiguous information centers, preferably four, whose centers define a polygon surrounding the center of the image of a pixel to be displayed, analogous to the contiguous cells of the LOD(M) Data that surround the center of the image of the pixel to be displayed and that are supplied to LOD(M) cell smoothing circuitry 30 from texture cell map storage means 12, as explained in detail in the above-identified Bunker et al application.

Cell smoothing circuitry 20 and 30 smooth the data from the four contiguous information centers and cells respectively supplied thereto in response to both the distance between the center of the pixel to be displayed and the center of the respective information centers and the respective contiguous cells, respectively. The smoothed value of the four contiguous cells is supplied to an input of cell blend circuitry 40 and also to an input of combiner circuitry 25 through AND gate 33 when the expression LOD(M)=LOD(0) is true, i.e. when argument M is equal to zero.

Combiner circuitry 25 combines, such as by adding, the value of the smoothed cell data from cell smoothing circuitry 30 to the value of the smoothed attenuated mini-cell data from cell smoothing circuitry 20 and supplies the resultant data to another input of cell blend circuitry 40. Cell blend circuitry 40 proportionately combines the signals obtained from cell smoothing circuitry 20 and 30 and makes the result available at the output of cell blend circuitry 40. The output from cell blend circuitry 40 is coupled to display circuitry (not shown) for processing as is known in the art.

Mini-cell random select means 13, mini-cell map storage means 14, attenuator means 16, multiplexer 18, AND gate 33 and combiner circuitry 25 may be readily added to circuitry, such as described in the aforementioned the Bunker et al application, for obtaining benefits of the present invention.

Thus has been illustrated and described apparatus and method for supplying texture detail to close-in surfaces without unduly increasing memory size requirements. Also shown and described is apparatus for providing texture detail to a close-in surface, wherein the apparatus may be readily retrofitted into an existing image generation system.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed:

1. In a computer image generation system, a method for defining detail including texture of a surface of an object of a scene to be displayed, wherein the object is disposed between a viewpoint and a proximate boundary of a predetermined maximum level of detail of the system, the method comprising:
    obtaining first data representative of the object at the maximum level of detail;
    obtaining random data at a predetermined derived level of detail in response to a distance from the viewpoint to the object; and
    combining the first data and the random data to form image data, wherein the image data define detail including texture of the surface of the object.

2. The method as in claim 1, wherein the random data include fractal data.

3. The method as in claim 1, further including obtaining the random data from a source of random data and predeterminedly attenuating the random data so that the resulting attenuated random data are at the derived level of detail.

4. The method as in claim 1, further including displaying the scene including the object, wherein a display of the object exhibits texture in response to the image data.

5. The method as in claim 1, wherein the first data are available from cells having a predetermined size and each having a predetermined intensity value, and the random data are available from a plurality of mini-cells having the predetermined size and further each mini-cell including a respective plurality of information centers for supplying the random data, wherein the step of obtaining random data includes:
    randomly selecting one of the plurality of mini-cells; and
    selecting data from predetermined ones of the information centers of the randomly selected one of the plurality of mini-cells, wherein the data from the predetermined ones of the information centers of the randomly selected mini-cell constitute the random data.

6. The method as in claim 5, wherein the step of selecting data includes selecting data from predetermined ones of the information centers whose centers define the vertices of a polygon containing the center of a projection of a pixel to be displayed.

7. The method as in claim 5, wherein the step of obtaining first data includes obtaining first data in response to the location of a predetermined area of the scene to be displayed, and further wherein randomly selecting includes randomly selecting in response to the location of the predetermined area of the scene to be displayed.

8. The method as in claim 1, further including:
    obtaining second data representative of the object at a second level of detail, wherein the second level of detail is less than the maximum level of detail;
    predeterminedly proportionately blending the first and second data to form image data for defining detail including texture for the surface of the object when the distance from the view-point to the object is greater than a predetermined threshold distance; and
    predeterminedly proportionately blending the first data and the random data to form the image data for defining the detail including texture of the surface of the object when the distance from the viewpoint to the object is less than the threshold distance.

9. In a computer image generation system for generating an image of an object, including a texture pattern for a surface of the object, from stored data by intensity control of pixels forming the image of the object, wherein the stored data include first and second cell data having a respective predetermined cell size and each cell having a predetermined intensity value, apparatus for supplementing the texture pattern when the object is between a viewpoint and a proximate boundary of a maximum level of detail area of the system, the apparatus comprising:
    switching means having a first input for receiving first cell data at a first level of detail and a second input for receiving random data at a derived level of detail, the switching means for supplying the first cell data when the object is beyond the proximate boundary of the maximum level of detail and for supplying the random data when the object is between the viewpoint and the proximate boundary of the maximum level of detail; and
    blending means having a first input for receiving second cell data at a second level of detail, the second level of detail being less than the first level of detail, and a second input coupled to the switching means, the blending means for blending the second cell data and the first cell data when the object is beyond the proximate boundary of the maximum level of detail and for blending the second cell data and the random data when the object is between the viewpoint and proximate boundary of the maximum level of detail.

10. Apparatus as in claim 9, further including:
    first smoothing means having an output coupled to the first input of the blending means and an input for receiving the second cell data, the first smoothing means for smoothing second data from a predetermined plurality of second cells, wherein the smoothed second data constitutes the second cell data supplied to the blending means;

second smoothing means connected between the switching means and the blending means, the second smoothing means having an output coupled to the second input of the blending means and an input for receiving the first cell data when the object is beyond the proximate boundary of the maximum level of detail and for receiving the random data when the object is between the viewpoint and the proximate boundary of the maximum level of detail, the second smoothing means for smoothing first data from a predetermined plurality of first cells, wherein the smooothed first data constitutes the first cell data supplied to the blending means, and for smoothing random data available from a predetermined plurality of data information centers of a predetermined one of a plurality of mini-cells, wherein the smoothed random data constitutes the random data supplied to the blending means.

11. Apparatus as in claim 9, further including attenuator means having an output coupled to the second input of the switching means and an input for receiving predetermined random data, the attenuator means for establishing the derived level of detail for the predetermined random data in response to the distance from the viewpoint to the object so that the random data available at the output of the attenuator means is at the derived level of detail.

12. Apparatus as in claim 11, further including storage means for storing the predetermined random data and random select means having an output coupled to the storage means, the predetermined random data including a plurality of mini-cells, each mini-cell being the same size as a cell at the maximum level of detail, the random select means for selecting one of the plurality of mini-cells in response to the location of the object.

13. In a computer image generation system for generating an image of an object, including a texture pattern for a surface of the object, from stored data by intensity control of pixels forming the image of the object, wherein the stored data include first and second cells having a respective predetermined cell size, and each cell having a predetermined intensity value, apparatus for supplementing the texture pattern when the object is between a viewpoint and a proximate boundary of a maximum level of detail area of the system, the apparatus comprising:

switching means having a first input for receiving the first cells at a first level of detail and a second input for receiving mini-cell data at a derived level of detail, the mini-cell data including randomized intensity values being independent from the intensity values of the first and second cells, the switching means for supplying the intensity values of the first cells when the object is beyond the proximate boundary of the maximum level of detail and for supplying the intensity values of the mini-cell data when the object is between the viewpoint and the proximate boundary of the maximum level of detail;

first cell smoothing means having an input coupled to the switching means, the first cell smoothing means for smoothing intensity values from a predetermined plurality of first cells when the first cells are supplied by the switching means, the predetermined plurality of first cells determinable in response to the center of the image of a pixel to be displayed, and for smoothing intensity values from a predetermined plurality of data information centers when the mini-cell data are supplied by the switching means, the predetermined plurality of data information centers determinable in response to the center of the image of the pixel to be displayed;

second cell smoothing means having an input for receiving intensity values of second cells, the second smoothing means for smoothing intensity values from a predetermined plurality of second cells, the predetermined plurality of second cells determinable in response to the center of the image of the pixel to be displayed; and blending means having a first input for receiving the smoothed intensity value of the second cells and a second input for receiving the smoothed intensity value of the first cells when the object is beyond the proximate boundary of the maximum level of detail and for receiving the smoothed intensity value of the mini-cell data when the object is between the viewpoint and the proximate boundary of the maximum level of detail, the blending means for predeterminedly proportionately blending the smoothed intensity value of the second cells with the data available at the second input of the blending means for obtaining a composite intensity value for controlling the intensity of the pixel to be displayed.

14. Apparatus as in claim 13, further including attenuator means having an output coupled to the switching means, the attenuator means for attenuating the mini-cell data in response to the distance between the object and the viewpoint for providing attenuated mini-cell data at the derived level-of-detail.

* * * * *